May 11, 1965      T. F. FLETCHER      3,182,621

LIFT-APPENDAGE FOR UNDERWATER VEHICLE

Filed Aug. 22, 1961      4 Sheets-Sheet 1

INVENTOR.
THEODORE F. FLETCHER
BY
Philip Schneider
ATTORNEY

May 11, 1965  T. F. FLETCHER  3,182,621
LIFT-APPENDAGE FOR UNDERWATER VEHICLE
Filed Aug. 22, 1961  4 Sheets-Sheet 4

INVENTOR.
THEODORE F. FLETCHER
BY
Philip Schneider
ATTORNEY

United States Patent Office 3,182,621
Patented May 11, 1965

3,182,621
LIFT-APPENDAGE FOR UNDERWATER VEHICLE
Theodore F. Fletcher, Los Angeles, Calif., assignor to the United States of America as represented by the Secretary of the Navy
Filed Aug. 22, 1961, Ser. No. 133,277
22 Claims. (Cl. 114—16)

This invention relates to underwater vehicles and especially to a lift-appendage for underwater vehicles.

The phonomenal growth of underseas research since World War II and the possibility that underseas mineral resources may some day be required as replacements for depleted continental mines have led to a rise in interest in underseas instruments and vehicles. Designs have been advanced for work vehicles operable by remote control and having external appendages which can perform a variety of operations such as grasping and manipulating tools of various types.

Since the ocean bottom may have extremely rough topographical characteristics, a vehicle dependent for locomotion upon wheels or tracks may frequently encounter situations in which it cannot progress along the ocean bottom. The ability to rise vertically, proceed in the horizontal direction and then return to the bottom can obviously constitute an invaluable asset for an underseas work vehicle. This invention affords such capacities to underseas vehicles.

The objects and advantages of the present invention are accomplished by utilizing a rotating blade device to provide lifting and propelling forces for an underseas work vehicle. A typical embodiment of the invention comprises a three-bladed, horizontal rotor mechanism from which the work vehicle is suspended by means of cables. Each blade of the rotor is rotated by a separate motor-propeller combination affixed to the blade. Directional steering is provided by altering the attitude of the fins which are attached to the rotor mechanism. Lateral thrust is obtained by varying the length of one or more of the suspension cables thereby tilting the plane of the rotor from the horizontal. The rotating blade device is immersed in and operates within the water medium.

An object of the invention is to provide an underseas work vehicle capable of vertical movement.

Another object is to provide an underseas work vehicle with vertical and horizontal maneuverability when the vehicle is above the ocean floor.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
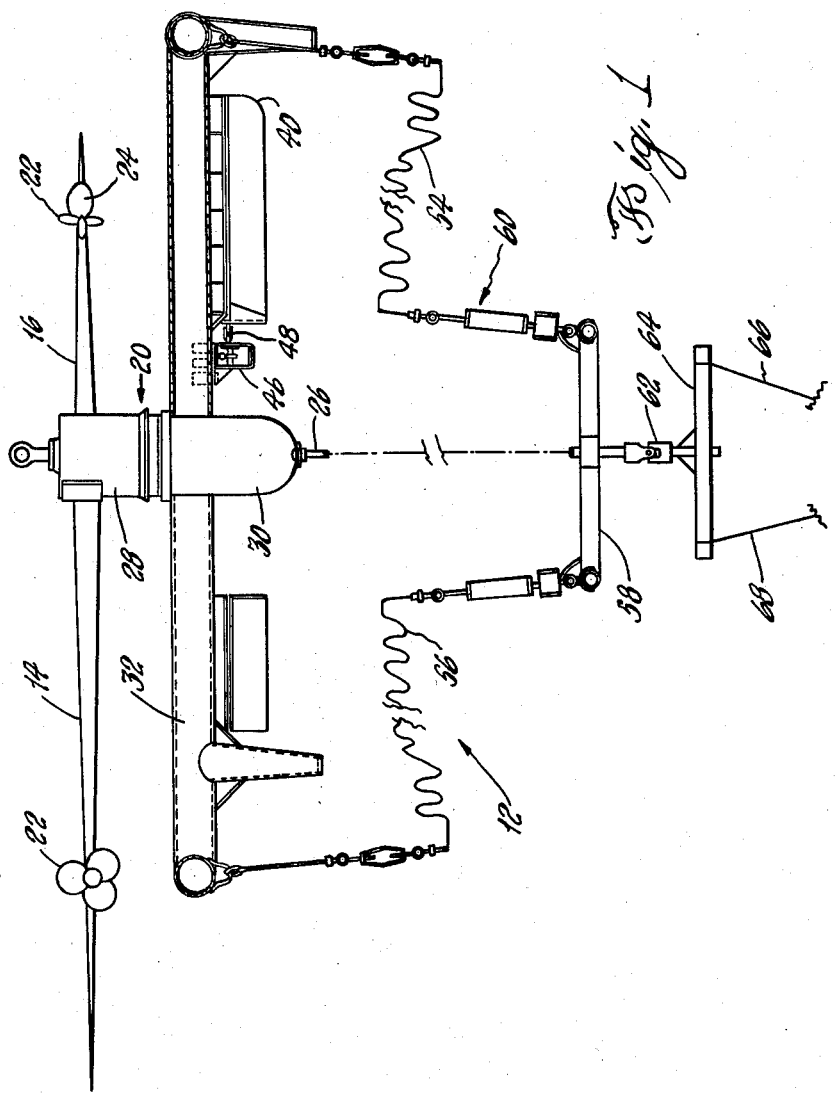
FIG. 1 is an elevational view of an embodiment of the invention and its relation to the underseas vehicle which it is supporting, the lift-appendage being shown in partial cross-section along the line 1—1 of FIG. 2.
Figure 2:
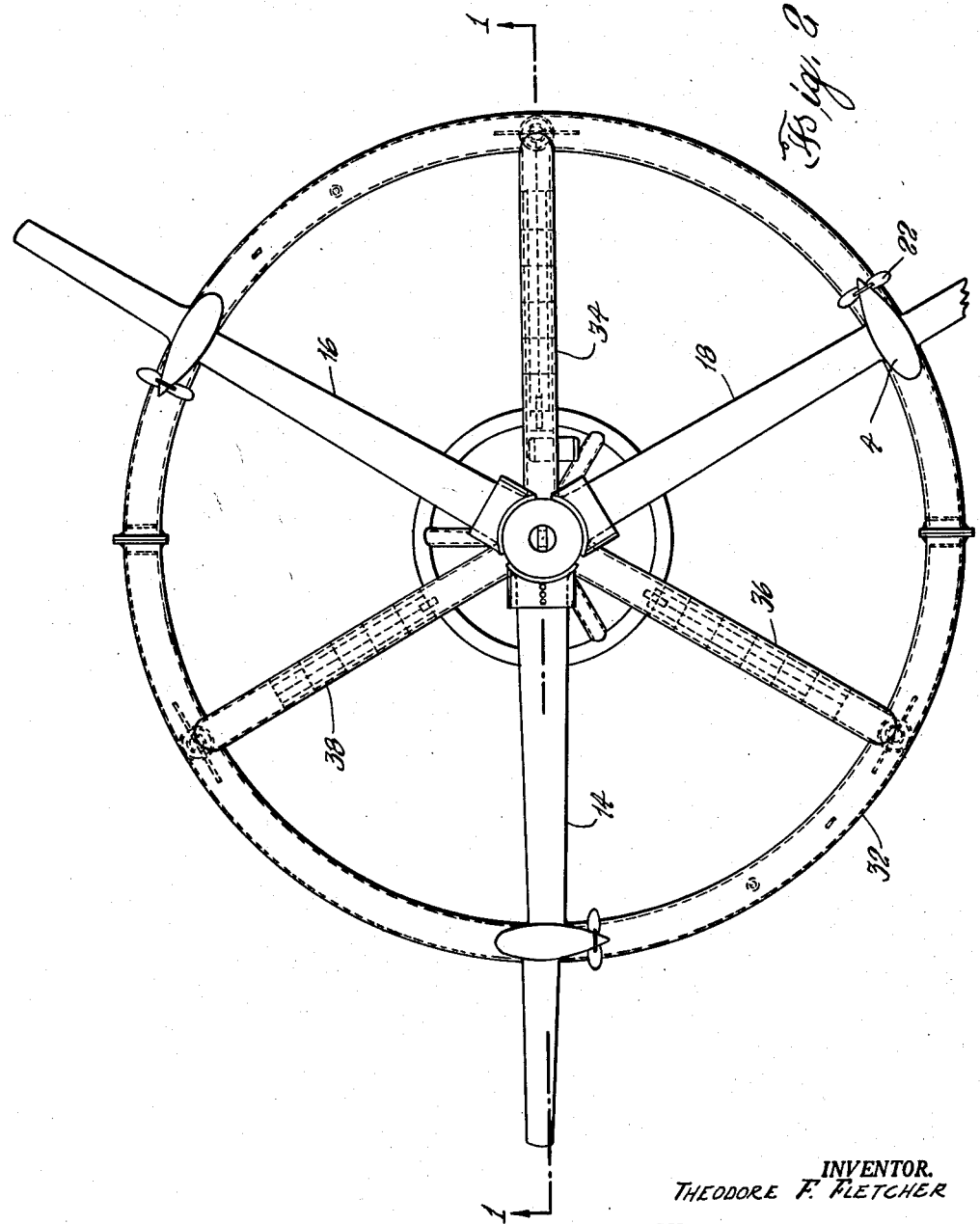
FIG. 2 is a top view of the rotor-and-support-ring mechanism of the invention.

FIG. 1 shows, in elevational view, an underwater work vehicle (not shown) suspended from a lift-appendage assembly 12. Comparison of FIGS. 1 and 2 indicates that the lift-appendage 12 is comprised of a horizontally mounted rotor having three blades 14, 16 and 18 spaced 120 degrees from each other. The blades are centrally mounted, being affixed by bolts to the hub assembly 20.

The blades are not similar to marine propeller blades in shape and cross-section but are similar to helicopter rotor blades, the surfaces being designed as airfoils and sections through the blades being airfoil sections. In the preferred embodiment, the design of the NACA 23012 series of airfoils was employed for the rotor blades.

Each rotor blade has independent motive power which is provided by a motor turning a small marine propeller 22. The motor, which cannot be seen in the drawings, is mounted about two-thirds of the way out from the hub assembly 20 in an oil-filled pod 24. Motor power is obtained through an electric power-and-control-information cable 26 extending from the underwater vehicle to the hub assembly 20.

The use of independent motors mounted upon the rotor blades to drive the rotor blades results in various advantages. For one thing, under lift conditions, the weight of the small motors relieves the bending moments developed in the blades; this is in consequence of centrifugal action. Secondly, no counter torque, except for that necessary to balance the bearing friction in the main rotor, is required as it would be, for example, if the rotor blades were all driven from a centrally located drive system. Thirdly, gear reduction systems are eliminated because the small marine propeller is directly connected to its motor shaft. Fourthly, each rotor blade motor can be individually started and accelerated to full speed and power output, thereby reducing the usual high starting power requirement.

In the preferred embodiment, split-phase capacitor motors are employed to drive the propellers. Step-speed control can be obtained by switching stator windings to give at least two stitched synchronous speeds on each motor. Having two possible speeds on each of three motors, nine speed combinations are available. While excellent speed control can be obtained through the use of a magnetic clutch or hydraulic transmission, the increase in size and weight introduced by these means is undesirable.

Figure 3:
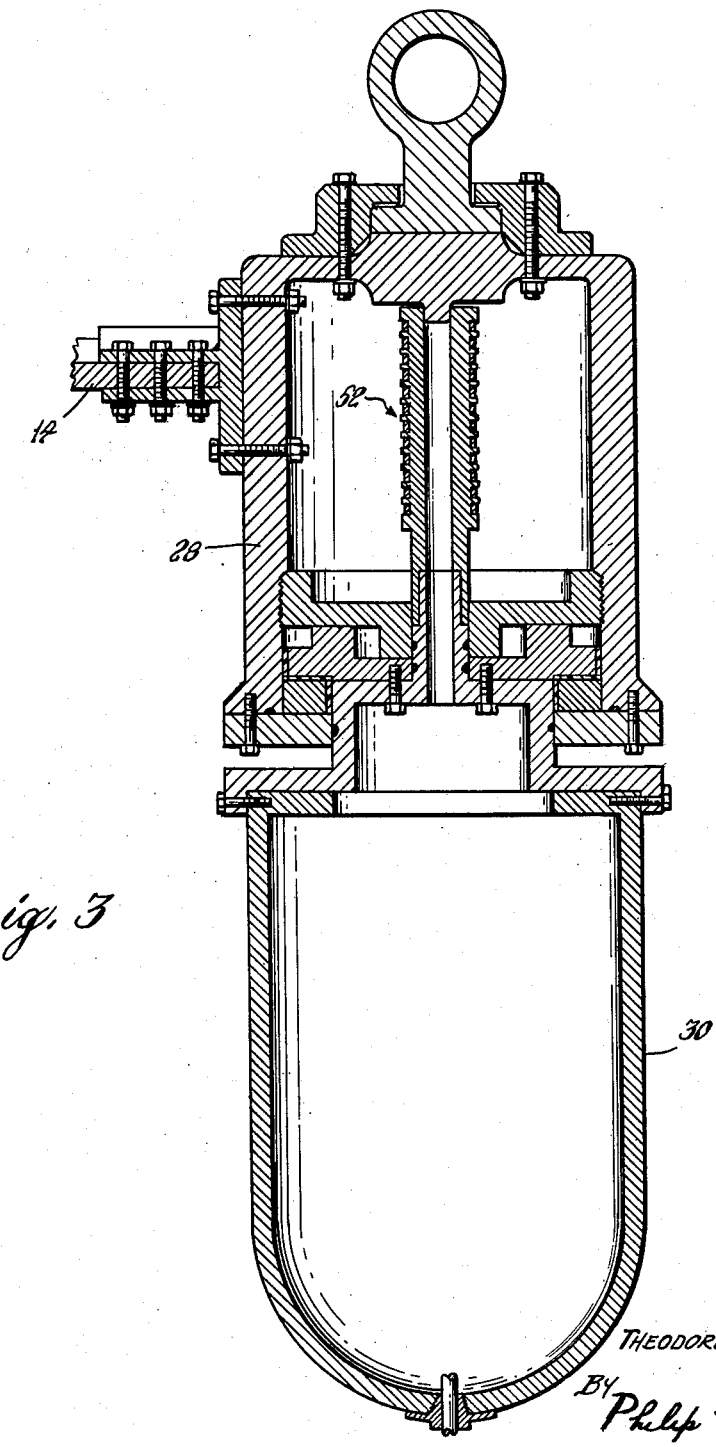
FIG. 3 is an elevational cross-section of the hub assembly.

As may be seen in FIG. 3, each of the rotor blades (e.g., 14) is bolted to the upper part 28 of the hub assembly housing. The lower part 30 of the hub assembly housing does not rotate and is securedy affixed by means of radial tubular spokes 34, 36 and 38 to the support ring 38. The support ring 32 is a tubular metal ring which supports the cables which suspend the underwater vehicle from the left-appendage assembly 12. The plane of the support ring 32 is horizontal. The hub, spokes and support ring provide positive buoyancy for lift-appendage assembly.

Affixed below each spoke 34, 36, 38 is a fin of which fin 40 is an example. The attitudes of these fins 40, 42 and 44 are independently alterable by means of small electric motor of which motor 46 is an example, the motors being installed in waterproof houisngs which are below and affixed to the spokes. The fins are rotatable about horizontal axes which run through the shafts of their associated drive motors, e.g., shaft 48 of motor 46. The fins provide counter-torque to the rotor bearing friction, yaw and pitch control and, by differential movement, also assist in steering the lift appendage in free suspension. They may be termed the position-control means of the support ring and may be defined as a passive type of position-control means since they do not operate by the exertion of inherent energy or force but rather by means of the force exerted against them by the water.

It should be noted that the spokes and support ring constitute a support frame work to which the cables and the steering controls (i.e., fins) are secured. The particular form of the framework may be altered; for example, the framework could consist of the three tubular spokes only. The advantage of the tubular ring, or annulus, employed in the preferred embodiment, is that a greater amount of positive buoyancy is provided for the lift-appendage.

Power is transmitted from the power cable 26 to wires extending out to the rotor blade drive motors and the fin motors by means of a slip-ring assembly 52 centrally located within the upper part 28 of the hub assembly 20.

The suspension assembly by means of which the underwater vehicle 10 is coupled to the lift-appendage 12 should comprise at least three cables at 120 degree spacings from each other. In the preferred embodiment, three pairs of cables are fastened at opposite sides of the support ring 32 and extend downward to a lower support ring 58. (A single pair of cables 54 and 56 is shown in FIG. 1.) The planes passing through the pairs of cables are separated from each other by a 120-degree angular spacing. Corresponding cables in each pair are connected to extensible link assemblies 60 by means of which the effective cable length may be shortened, when desired. These extensible link assemblies 60 may be of the ball-screw type powered by electric motors, or of the hydraulic type, whichever is more compatible with the equipment aboard the underwater vehicle. By differentially changing the lengths of one or more of three cables, the plane of the rotor blades may be tilted from the horizontal to provide lateral thrust in different directions. The greater the tilt, the greater will be the thrust provided in a given direction and therefore the greater will be the speed of travel of the underwater vehicle in that direction.

The lower support ring 58 is attached by means of a universal joint 62 to a rectangular cable support frame 64 from the corners of which four cables (two of which, 66 and 68, are shown) extend downward to support the underwater vehicle. The universal joint 62 is provided so that swinging of the suspended vehicle will not tilt the plane of the rotors and so that relative rotation between the lift-appendage assembly 12 and the underwater vehicle will not act to entangle the supporting cables.

It should be noted that the shapes of the support rings and support frame do not necessarily have to be circular and rectangular, respectively, as they are in the preferred embodiment. The support rings could be triangular and the support frame circular, for example.

The motors in the extensible link assemblies 60 derive power from the power cable 26. Tap-offs can be made by any suitable method.

Figure 4:
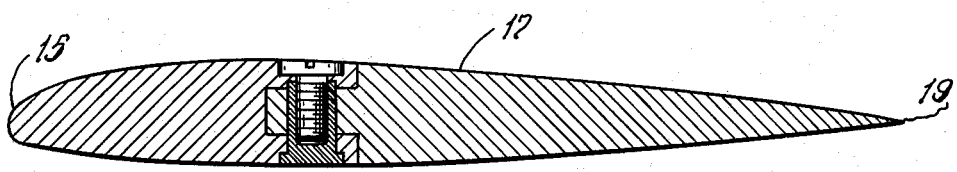
FIG. 4 is a cross-sectional view of a rotor blade.

The materials used in the rotor blades are stainless steel for the nose portion 15 and aluminum alloy in the body 17 and trailing edge 19 (see FIG. 4). In order to provide against interaction between the steel and aluminum in the salt-water medium, a coating of protective material such as Fiberglas bonded by resin is employed. Of course, the usual zinc chromate paste and/or lead primers can be used, if desired, to eliminate contact between dissimilar metals at points of attachment.

The support ring 32, hub assembly housing, fins, lower support ring 58 and cable support frame 64 are of aluminum alloy. It is preferable to coat them with Fiberglas and resin or some other suitable corrosion-resistant coating.

Bearings for the rotor are of the solid-ring type fabricated from naval bronze or manganese bronze.

The motor housings are of aluminum. The small propellers are of marine bronze. A small streamlined anti-corrosion nut, such as the Perry nut, is used for retention of the propellers.

The support cables are of stranded stainless steel and are kept well coated with marine grease. Fittings are either of Monel metal or stainless steel.

Typical parameters for a lift-appendage which might be used with an underwater vehicle weighing 8000 pounds submerged weight are:

Rotor blades about 11 feet from center of hub tip;
Support ring about 16 feet in diameter;
Drive motors about 20 horsepower;
Drive propellers are standard marine 12-inch, 3-blade propellers of pitch-to-diameter ratio 1.25.

A remote control system, such as the Hughes Aircraft Company Mark I Mobot system, is employed in conjunction with this lift-appendage. The system requires some minor modifications to adapt it to the present application but these modifications are well within the skill of a competent electronic engineer.

Obviously many modifications and variations of the present invention are possible in the light of the above teachings. It is therefore to be understood that within the scope of the appended claims the invention may be practiced otherwise than as specifically described.

I claim:

1. An undersea lift-appendage for an undersea vehicle comprising, in combination: support means comprising a hub assembly and a support framework, said hub assembly having a casing with a fixed section and a rotatable section and said support framework being affixed to and extending outward from said fixed casing section; rotor means adapted to provide lift and thrust forces for said lift-appendage and comprising a plurality of rotor blades and drive means, the surface and cross-section of each of said blades being similar to that of an air foil, each respective drive means being mounted upon and arranged to drive a different one of said blades, said blades being attached to said rotatable casing section at equally spaced points, and said rotor means operating within the underseas medium; suspension means affixed to said support framework for suspending said undersea vehicle from said support framework; and means for supplying power to said drive means.

2. An undersea lift-appendage for an undersea vehicle comprising, in combination: support means comprising a hub assembly and a support framework, said hub assembly having a casing with a fixed section and a rotatable section and said support framework being affixed to and extending outward from said fixed casing section; rotor means adapted to provide lift and thrust forces for said lift-appendage and comprising a plurality of rotor blades and drive means, the surface and cross-section of each said blades being similar to that of an airfoil, each respective drive means being mounted upon and arranged to drive a different one of said blades, said blades being attached to said rotatable casing section at equally spaced points, and said rotor means operating within the underseas medium; suspension means including a plurality of cable affixed to said support framework for suspending said undersea vehicle from said support framework; and means for supplying power to said drive means.

3. An undersea lift-appendage for an undersea vehicle comprising, in combination: support means comprising a hub assembly and a first support framework, said hub assembly having a casing with a fixed section and a rotatable section and said first support framework being affixed to and extending outward from said fixed casing section; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said rotatable casing section of said hub assembly at equally spaced points; suspension means comprising a plurality of cables, a second support framework, a third support framework and universal joint means, said cables being affixed at spaced points to said first and second support frameworks whereby said second support framework can hang suspended from said first support framework, said third support framework being suspended from said second support framework by means of said universal joint means; and power connection means for connecting power to said rotor-blade motors.

4. An undersea lift-appendage for an undersea vehicle comprising, in combination: support means comprising a hub assembly and a first support framework, said hub assembly having a casing with a fixed section and a rotatable section and said first support framework being affixed to and extending outward from said fixed casing section; rotor means comprising a plurality of rotor blades and drive means, the surface and cross-section of each said blade being similar to that of an airfoil, each respective drive means being mounted upon and arranged to drive a different one of said blades, said blades being attached to said rotatable casing section at equally spaced points, the normal plane of rotation of said blades being the horizontal plane; suspension means including a plurality of cables affixed to said support framework for suspending said underseas vehicle from said support framework; lateral thrust means comprising cable-length adjustment means coupled to said cables for independently altering the lengths of each of at least three of said cables so that the plane of rotation of said rotor blades is variable from the horizontal; position control means attached to said support means for controlling pitch, yaw and direction of horizontal travel of said lift-appendage, said position-control means comprising a plurality of movable fins and a plurality of drive means, each drive means being coupled to independently move a different one of said fins; and power connection means for connecting power to said rotor-blade-drive means, said cable-length adjustment means and said fin-drive means.

5. An underseas lift-appendage for an underseas vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, said cables being affixed at spaced points to said first support ring and said second support ring whereby said second support ring can hang suspended from said first support ring, said support framework being suspended from said second support ring by means of said universal joint means; and power connection means for connecting power to said rotor-blade motors.

6. An underseas lift-appendage for an underseas vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, said cables being affixed at spaced points to said first support ring and said second support ring whereby said second support ring can hang suspended from said first support ring, said support framework being suspended from said second support ring by means of said universal joint means; lateral thrust means comprising cable-length adjustment means coupled to said cables for independently altering the lengths of each of at least three of said cables; position-control means attached to said support means for controlling pitch, yaw and direction of horizontal travel of said lift-appendage, said steering means comprising a plurality of movable fins and a plurality of motors, each motor being coupled to move a different one of said fins; and power connection means for connecting power to said rotor-blade motors, said fin motors and said cable-length adjustment means.

7. An underseas lift-appendage for an underseas vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight, hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, said cables being affixed at spaced points to said first support ring and said second support ring whereby said second support ring can hang suspended from said first support ring, said support framework being suspended from said second support ring by means of said universal joint means; lateral thrust means comprising cable-length adjustment means coupled to said cables for independently altering the lengths of each of at least three of said cables; position-control means for controlling pitch, yaw and direction of horizontal travel of said lift-appendage, said steering means comprising a plurality of movable fins and a plurality of motors, each motor being coupled to vary the attitude of a different one of said fins and each motor-fin combination being attached to a different one of said spokes; and power connection means for connecting power to said rotor-blade motors, said fin motors and said cable-length adjustment means.

8. An underseas lift-appendage for an underseas vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight, hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blade being attached to said upper casing section of said hub assembly at equally spaced points, the normal plane of rotation of said blades being the horizontal plane; suspension means comprising a plurality of cables, a second support ring, a support framework and universal joint means, at least three of said cables being attached to said first and second support rings at 120-degree intervals so that said second support ring can hang suspended from said first support ring, said support framework being suspended from said second support ring by means of said universal joint means; lateral thrust means comprising cable-length adjustment means coupled to said cables for independently altering the lengths of each of at least three of said cables; position-control means for controlling pitch, yaw and direction of horizontal travel of said lift-appendage, said steering means comprising a plurality of movable fins and a plurality of motors, each motor being coupled to vary the attitude of a different one of said fins and each motor-fin combination being attached to a different one of said spokes; and power connection means for connecting power to said rotor-blade motors, said fin motors and said cable-length adjustment means.

9. An undersea lift-appendage for an undersea vehicle comprising, a combination: support means comprising a central hub assembly, a first support ring and at least three spokes, said hub assembly having a core section and a casing with upper and lower sections, the lower casing section being fastened to said core section and the upper casing section being rotatable around said core section, said support ring comprising a watertight, hollow tubular annulus concentric with said hub assembly, said spokes comprising watertight, hollow tubular rods radiating at 120-degree angular spacings from said lower casing to said support ring and affixed to both said casing and said ring; rotor means comprising at least three rotor blades, drive motors and propellers, the surface and cross-section of each said blade being similar to that of an airfoil, each respective drive motor being arranged to drive a different one of said propellers and being mounted on a different one of said blades approximately one-third of the distance from the end of the blade, said blades being attached to said upper casing section of said hub assembly at 120-degree angular spacings, the normal plane of rotation of said blades being the horizontal plane; suspension means comprising a plurality of cables, a second support ring, a support framework and universal joint means, at least three of said cables being attached to said first and second support rings at 120-degree intervals so that said second support ring can hang suspended from said first support ring, said support framework being suspended from said second support ring by means of said universal joint means; lateral thrust means comprising cable-length adjustment means coupled to at least three of said 120-degree-spaced cables for independently altering the length of each of said cables; position-control means for controlling pitch, yaw and direction of horizontal travel of said lift-appendage, said steering means comprising at least three sets of movable fins and motors, each motor being coupled to vary the attitude of a different one of said fins and each motor-fin set being attached to a different one of said 120-degree spaced spokes; and power connection means for connecting power to said rotor-blade motors, said fin motors and said cable-length adjustment means.

10. An undersea lift-appendage for an undersea vehicle comprising, in combination: support means comprising a hub assembly and a first support framework said hub assembly having a casing with a fixed section and a rotatable section and said first support framework being affixed to and extending outward from said fixed casing section; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said rotatable casing section of said hub assembly at equally spaced points; suspension means comprising a plurality of cables, a second support framework, a third support framework and universal joint means, said cables being affixed at spaced points to said first and second support frameworks whereby said second support framework can hang suspended from said first support framework, said third support framework being suspended from said second support framework by means of said universal joint means; second suspension means attached to said third support framework for suspending said undersea vehicles from said third support framework; and power connection means for connecting power to said rotor-blade motors.

11. An undersea lift-appendage for an undersea vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, said cables being affixed at spaced points to said first support ring and said second support ring whereby said second support ring can hang suspended from said first support ring, said support framework being suspended from said second support ring by means of said universal joint means; second suspension means attached to said support framework for suspending said undersea vehicle from said support framework; and power connection means for connecting power to said rotor-blade motors.

12. An undersea lift-appendage for undersea vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight, hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, said cables being affixed at spaced points to said first support ring and said second support ring whereby said second support ring can hang suspended from said first support ring, said support framework being suspended from said second support ring by means of said universal joint means; second suspension means comprising at least three cables affixed to said support framework for suspending said undersea vehicle from said support framework; lateral thrust means comprising cable-length adjustment means coupled to said cables for independently altering the lengths of each of at least three of said cables; position-control means attached to said support means for controlling pitch, yaw and direction of horizontal travel of said lift-appendage, said steering means comprising a plurality of movable fins and a plurality of motors, each motor being coupled to move a different one of said fins; and power connection means for connecting power to said rotor-blade motors, said fin motors and said cable-length adjustment means.

13. An underseas lift-appendage for an underseas vehicle comprising, in combination: support means comprising a central hub assembly, a first support ring and a plurality of spokes, said hub assembly having a core and a casing with upper and lower sections, the lower casing section being fastened to said core and the upper casing section being rotatable around said core, said support ring comprising a watertight, hollow tubular annulus concentric with said hub assembly, and said spokes comprising watertight, hollow tubular rods radiating from said lower casing to said support ring and affixed to each; rotor means comprising a plurality of rotor blades, drive motors and propellers, the surface and cross-section of each said blade being similar to that of an airfoil, each respective drive motor being arranged to drive a different one of said propellers and being mounted on a different one of said blades, said blades being attached to said upper casing section of said hub assembly at equally spaced points, the normal plane of rotation of said blades being the horizontal plane; suspension means comprising a plurality of cables, a second support ring, a support framework and universal joint means, at least three of said cables being attached to said first and second support rings at 120-degree intervals so that said second support ring can hang suspended from said first support ring, said support framework being suspended from said second support ring by means of said universal joint means; second suspension means comprising at least three cables affixed to said support framework for suspending said underseas vehicle from said support framework; lateral thrust means comprising cable-length adjustment means coupled to said cables for independently altering the lengths of each of at least three of said cables; steering means for controlling pitch, yaw and direction of horizontal travel of said lift-appendage, said position-control means comprising a plurality of movable fins and a plurality of motors, each motor being coupled to vary the attitude of a different one of said fins and each motor-fin combination being attached to a different one of said spokes; and power connection means for connecting power to said rotor-blade motors, said fin motors and said cable-length adjustment means.

14. An underseas lift-appendage for an underseas vehicle comprising, in combination: support means comprising a central hub assembly, a first support ring and at least three spokes, said hub assembly having a core section and a casing with upper and lower sections, the lower casing section being fastened to said core section and the upper casing section being rotatable around said core section, said support ring comprising a watertight, hollow tubular annulus concentric with said hub assembly, said spokes comprising watertight, hollow tubular rods radiating at 120-degree angular spacings from said lower casing to said support ring and affixed to both said casing and said ring; rotor means comprising at least three rotor blades, drive motors and propellers, the surface and cross-section of each said blade being similar to that of an airfoil, each respective drive motor being arranged to drive a different one of said propellers and being mounted on a different one of said blades approximately one-third of the distance from the end of the blade, said blades being attached to said upper casing section of said hub assembly at 120-degree angular spacings, the normal plane of rotation of said blades being the horizontal plane; suspension means comprising a plurality of cables, a second support ring, a support framework and universal joint means, at least three of said cables being attached to said first and second support rings at 120-degree intervals so that said second support ring can hang suspended from said first support ring, said support framework being suspended from said second support ring by means of said universal joint means; second suspension means comprising at least three cables affixed to said support framework for suspending said underseas vehicle from said support framework; lateral thrust means comprising cable-length adjustment means coupled to at least three of said 120-degree-spaced cables for independently altering the lengths of each of said cables; position-control means for controlling pitch, yaw and direction of horizontal travel of said lift-appendage, said steering means comprising at least three sets of movable fins and motors, each motor being coupled to vary the attitude of a different one of said fins and each motor-fin set being attached to a different one of said 120-degree-spaced spokes; and power connection means for connecting power to said rotor-blade motors, said fin motors and said cable-length adjustment means.

15. An underseas lift-appendage for an underseas vehicle comprising, in combination:
   support means comprising a hub assembly and a support framework, said hub assembly having a casing with a fixed section and a rotatable section and said support framework being affixed to and extending outward from said fixed casing section;
   motive means comprising a plurality of rotor blades and drive means, the surface and cross-section of each of said blades being similar to that of an airfoil, each respective drive means being mounted upon and arranged to drive a different one of said blades, said blades being attached to said rotatable casing section at equally spaced points, and said rotor means operating within the underseas medium and being adapted to provide lift and thrust forces for said lift-appendage;
   position-control means attached to said support means for controlling the orientation of said support means;
   suspension means affixed to said support framework for suspending said underseas vehicle from said support framework; and
   means for supplying power to said drive means and to said position-control means.

16. A device as set forth in claim 15, wherein said position-control means comprises a set of movable fins.

17. An underseas lift-appendage for an underseas vehicle comprising, in combination:
   support means comprising a hub assembly and a support framework, said hub assembly having a casing with a fixed section and a rotatable section and said support framework being affixed to and extending outward from said fixed casing section;
   motive means comprising a plurality of rotor blades and drive means, the surface and cross-section of each of said blades being similar to that of an airfoil, each respective drive means being mounted upon and arranged to drive a different one of said blades, said blades being attached to said rotatable casing section at equally spaced points, and said rotor means operating within the underseas medium and being adapted to provide lift and thrust forces for said lift-appendage;
   suspension means affixed to said support framework for suspending said underseas vehicle from said support framework, said suspension means being extensible and contractible in length; and
   means for supplying power to said drive means.

18. An underseas lift-appendage for an underseas vehicle comprising, in combination:
  support means comprising a hub assembly and a support framework, said hub assembly having a casing with a fixed section and a rotatable section and said support framework being affixed to and extending outward from said fixed casing section;
  motive means comprising a plurality of rotor blades and drive means, the surface and cross-section of each of said blades being similar to that of an airfoil, each respective drive means being mounted upon and arranged to drive a different one of said blades, said blades being attached to said rotatable casing section at equally spaced points, and said rotor means operating within the underseas medium and being adapted to provide lift and thrust forces for said lift-appendage;
  position-control means of the passive type attached to said support means for controlling the orientation of said support means;
  suspension means affixed to said support framework for suspending said underseas vehicle from said support framework, said suspension means being extensible and contractible in length; and
  means for applying activating power to said rotor drive means.

19. An underseas lift-appendage for an underseas vehicle comprising, in combination:
  support means;
  rotor means of the helicopter type attached to said support means, said rotor means operating within the underseas medium and being adapted to provide lift and thrust forces to move said support means within said medium;
  suspension means affixed to said support means for suspending said underseas vehicle from said support means, said suspension means being extensible and contractible in at least one of its dimensions; and
  means for applying activating power to said rotor means.

20. An underseas lift-appendage for an underseas vehicle comprising in combination:
  support means;
  rotor means of the helicopter type attached to said support means, said rotor means operating within the underseas medium and being adapted to provide lift and thrust forces to move said support means within said medium;
  position-control means affixed to said support means for controlling the orientation of said support means;
  suspension means affixed to said support means for suspending said underseas vehicle from said support means, said suspension means being extensible and contractible in at least one of its dimensions; and
  means for applying activating power to said rotor means.

21. An underseas device as set forth in claim 20, wherein said suspension means comprises
  a plurality of suspension elements affixed at spaced points to said support means, each suspension element being individually extensible and contractible in length.

22. A device as set forth in claim 21, wherein said position-control means comprises a set of movable fins.

References Cited by the Examiner

UNITED STATES PATENTS

| | | | |
|---|---|---|---|
| 1,321,383 | 11/19 | Matter | 114—16.05 X |
| 1,343,744 | 6/20 | Pendergast | 61—69 |
| 1,385,908 | 7/21 | Dunwoody | 170—159 |
| 2,144,860 | 1/39 | Thorp | 180—159 |
| 2,301,417 | 4/39 | Larsen | 170—135.21 |
| 2,511,156 | 6/50 | Glass | 115—34 |
| 2,519,453 | 8/50 | Goodman | 114—16 X |
| 2,700,781 | 2/55 | Smith | 244—1 |
| 2,954,186 | 9/60 | Bribrey | 244—17.19 |
| 2,974,627 | 3/61 | Whipple | 115—6 X |
| 2,981,073 | 4/61 | Robinson | 114—16.05 X |

FOREIGN PATENTS 551,361  11/56  Italy.

FERGUS S. MIDDLETON, *Primary Examiner.*

MILTON BUCHLER, *Examiner.*